July 28, 1953   P. J. HUEBSHMAN   2,647,009
APPARATUS FOR MOTOR TRANSPORTS
Filed Jan. 16, 1950   8 Sheets-Sheet 1
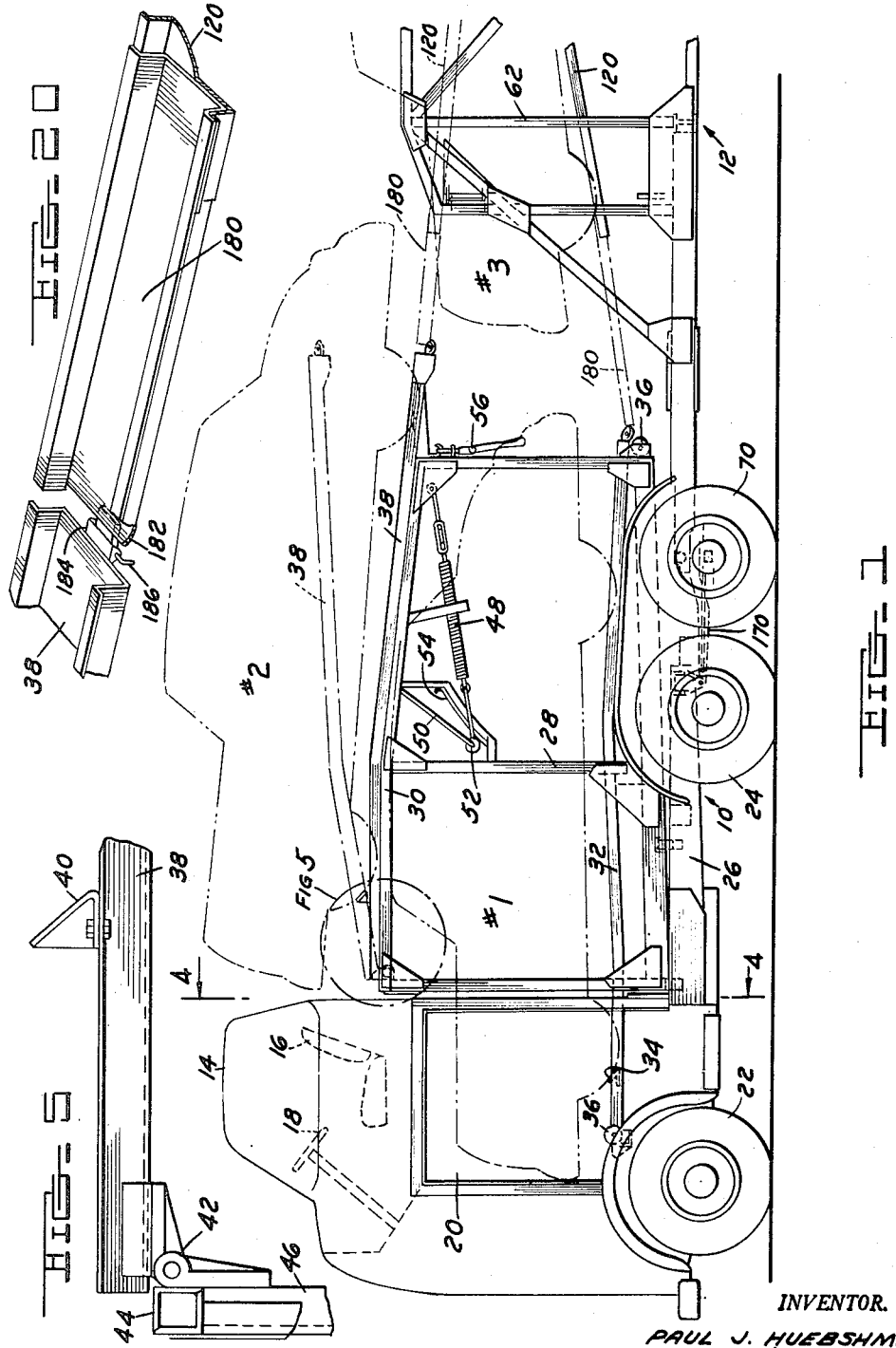
INVENTOR.
PAUL J. HUEBSHMAN
BY Whittemore,
Hulbert & Belknap
ATTORNEYS July 28, 1953 P. J. HUEBSHMAN 2,647,009
APPARATUS FOR MOTOR TRANSPORTS
Filed Jan. 16, 1950 8 Sheets-Sheet 2
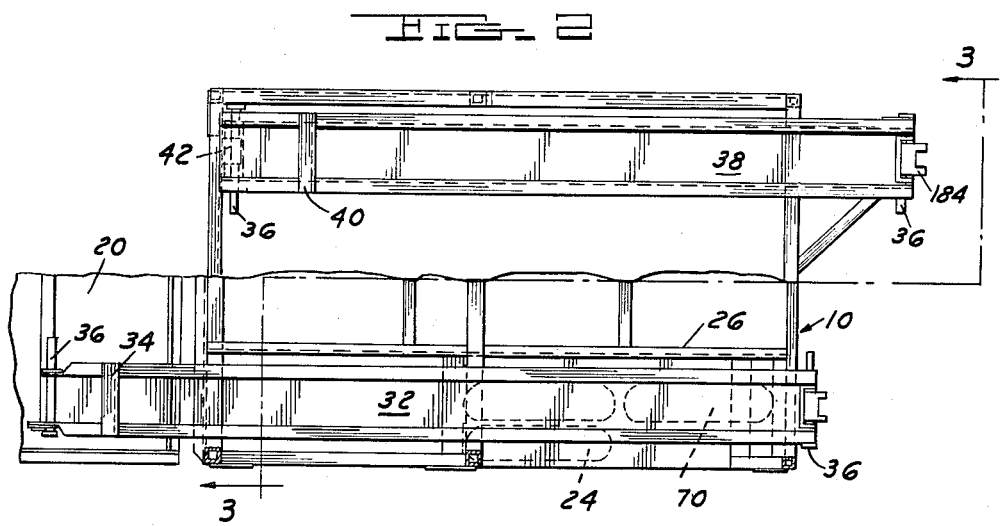
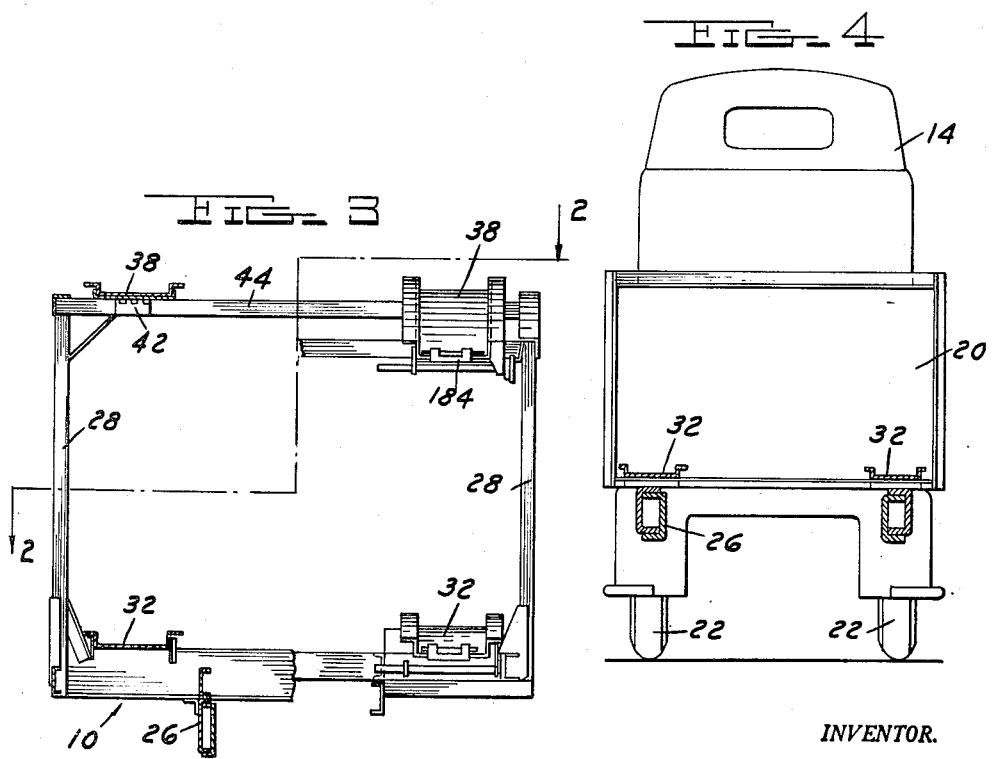
INVENTOR.
PAUL J. HUEBSHMAN
BY Whittemore,
Hulbert & Belknap
ATTORNEYS July 28, 1953 P. J. HUEBSHMAN 2,647,009
APPARATUS FOR MOTOR TRANSPORTS
Filed Jan. 16, 1950 8 Sheets-Sheet 3
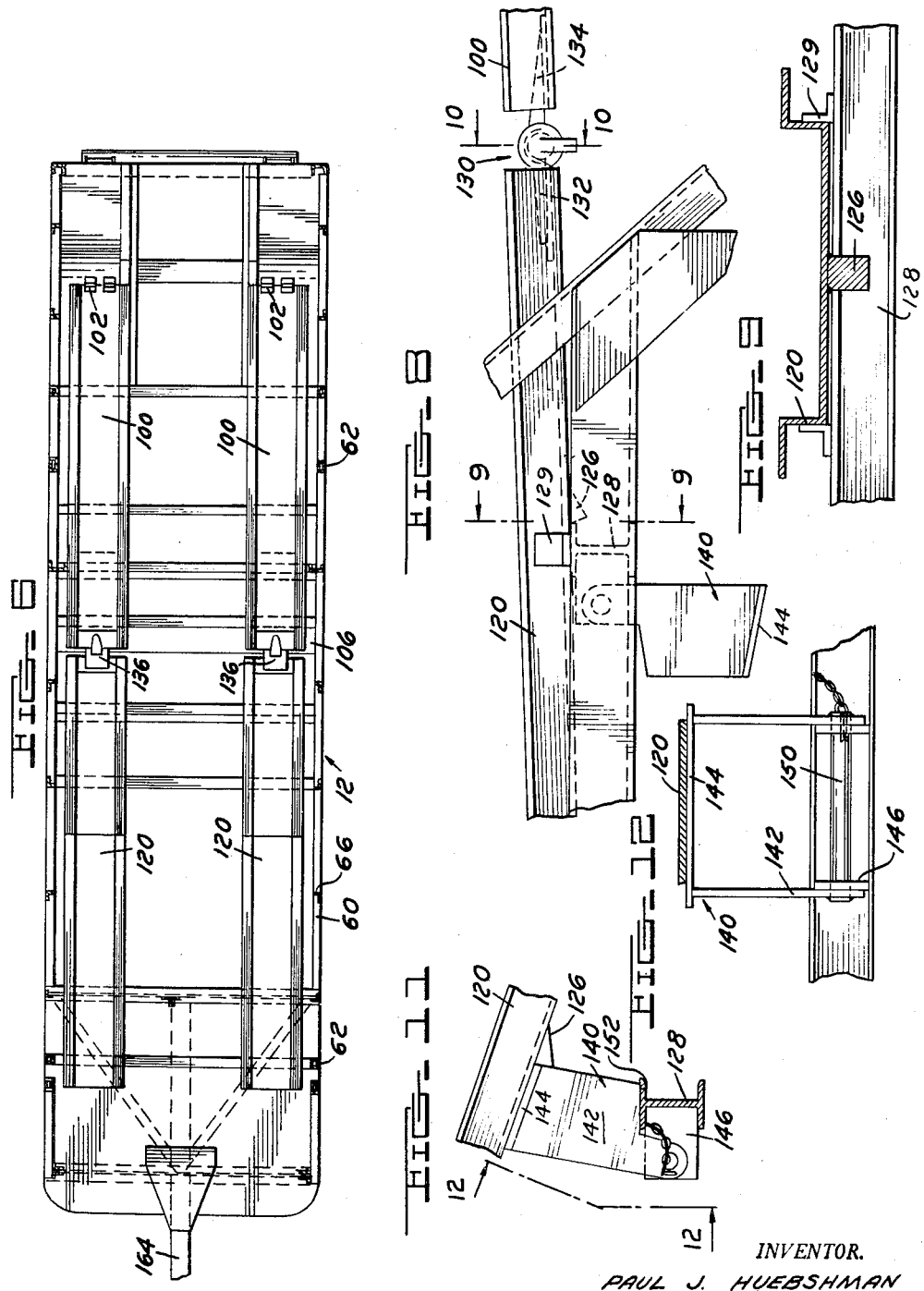
INVENTOR.
PAUL J. HUEBSHMAN
BY Whittemore,
Hulbert & Belknap
ATTORNEYS July 28, 1953 P. J. HUEBSHMAN 2,647,009
APPARATUS FOR MOTOR TRANSPORTS
Filed Jan. 16, 1950 8 Sheets-Sheet 4
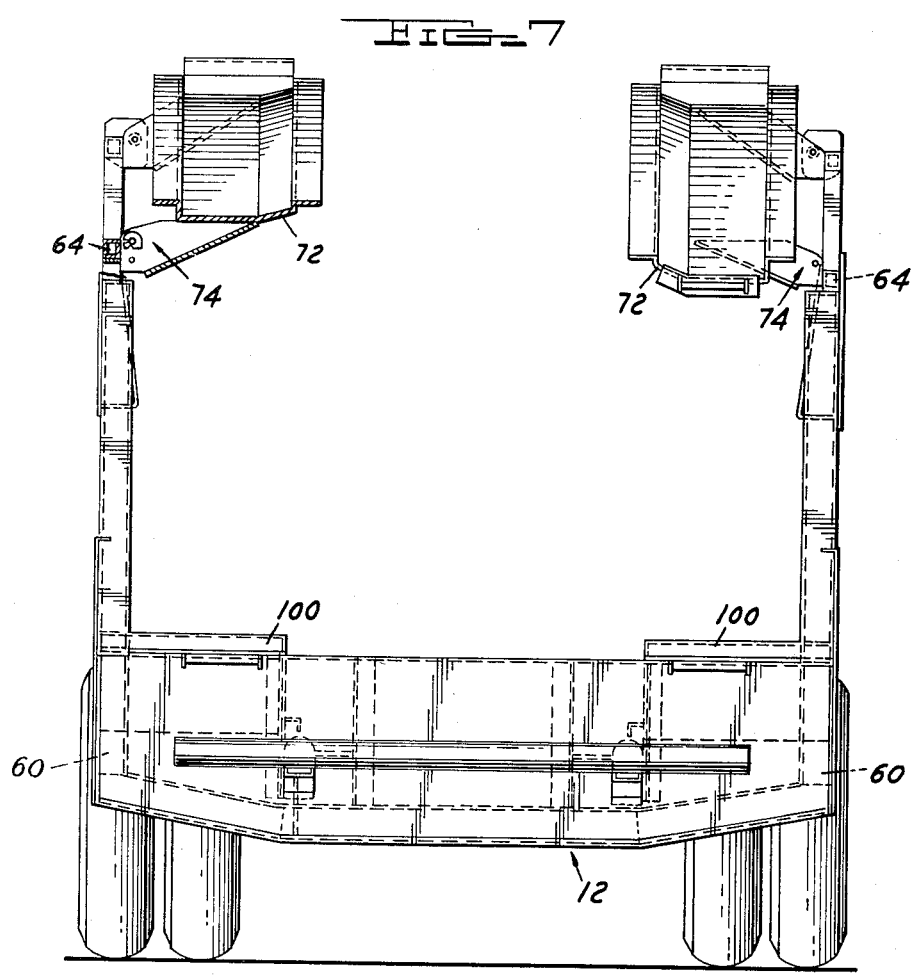
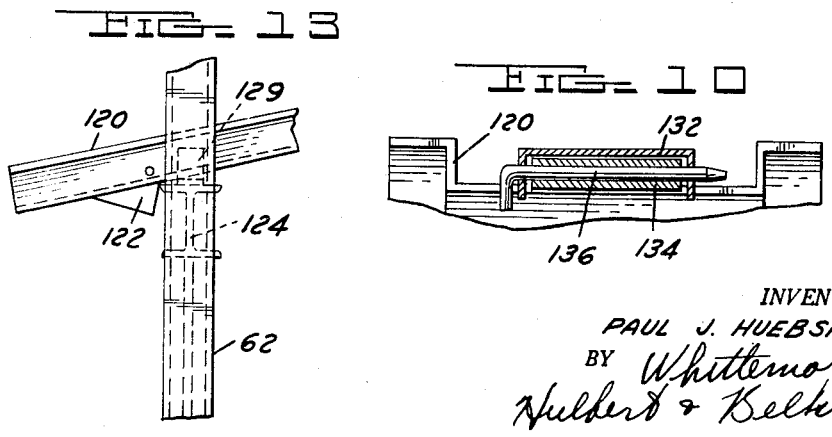
INVENTOR.
PAUL J. HUEBSHMAN
BY Whittemore,
Hulbert & Belknap
ATTORNEYS July 28, 1953 P. J. HUEBSHMAN 2,647,009
APPARATUS FOR MOTOR TRANSPORTS
Filed Jan. 16, 1950 8 Sheets-Sheet 5
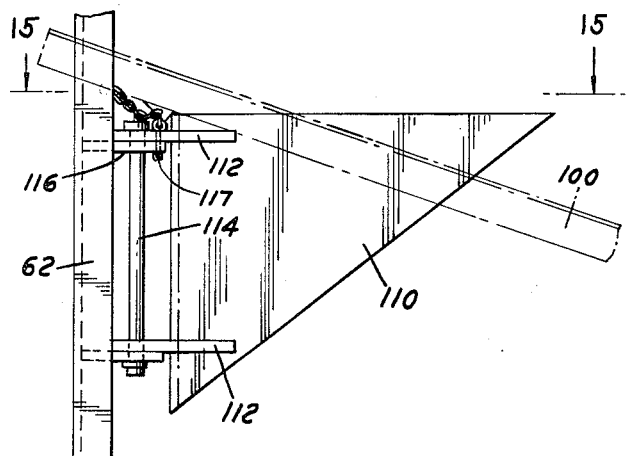
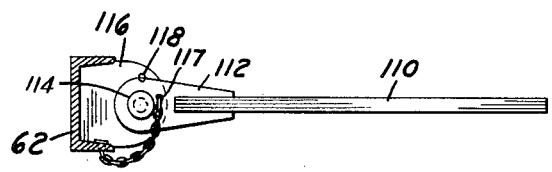
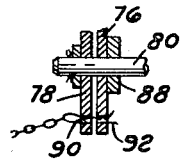
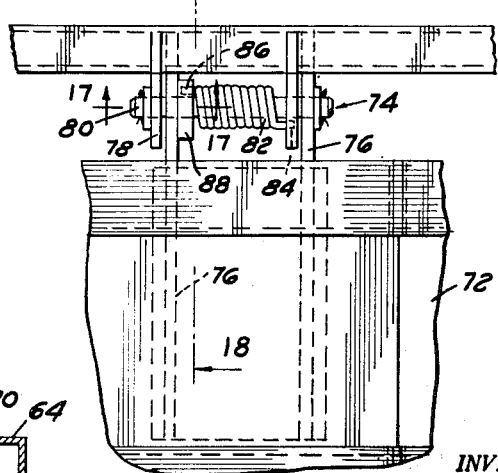
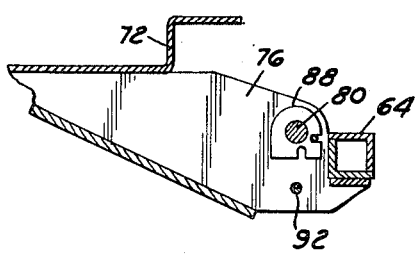
INVENTOR.
PAUL J. HUEBSHMAN
BY Whittemore,
Hulbert & Belknap
ATTORNEYS July 28, 1953 P. J. HUEBSHMAN 2,647,009
APPARATUS FOR MOTOR TRANSPORTS
Filed Jan. 16, 1950 8 Sheets-Sheet 6
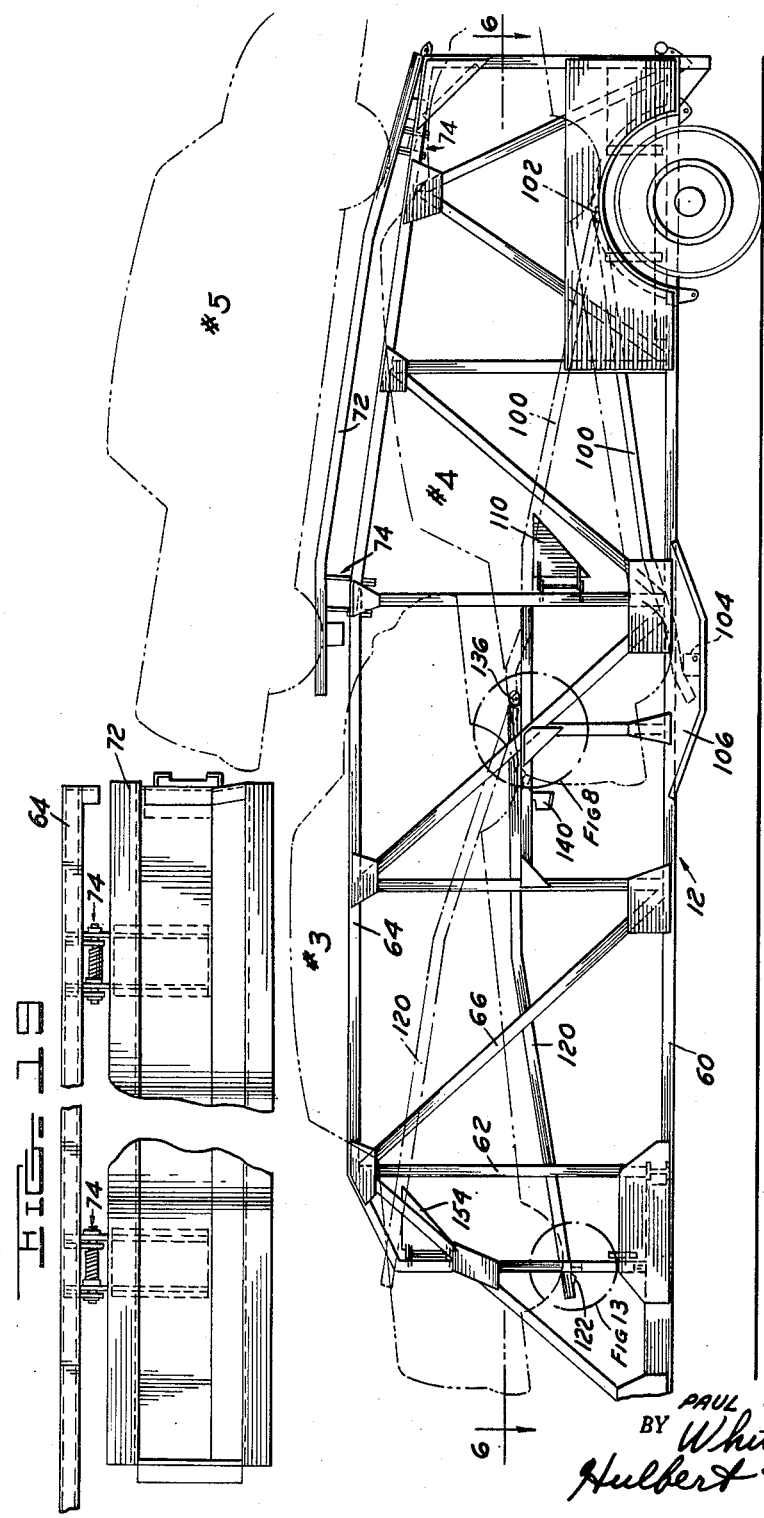

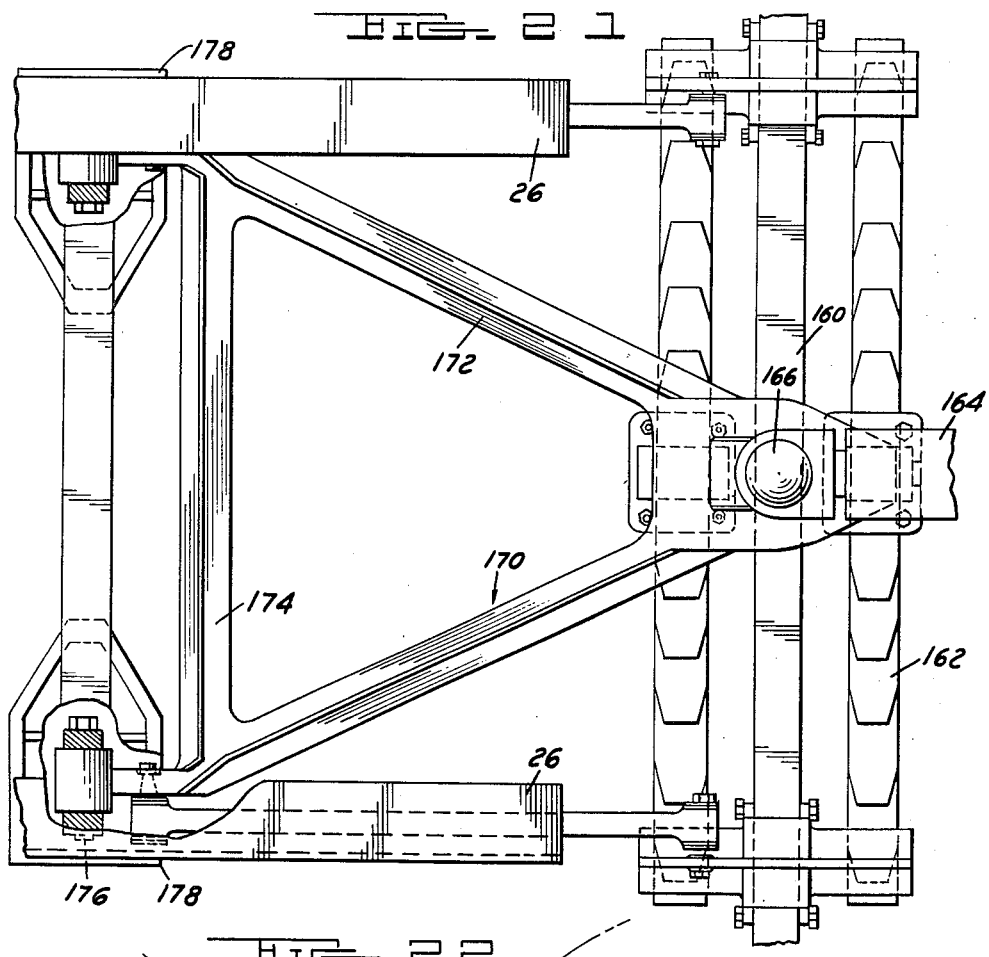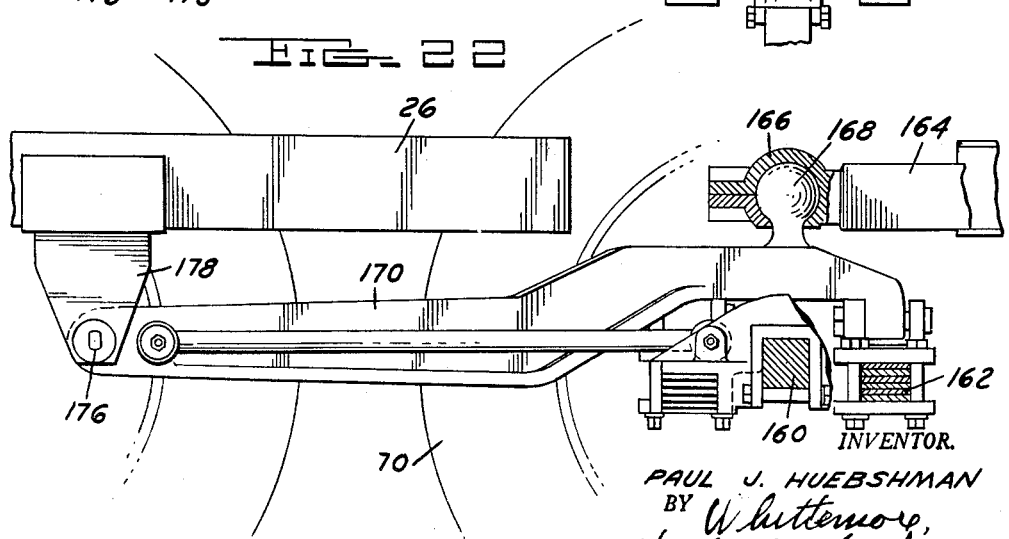

Patented July 28, 1953

2,647,009

UNITED STATES PATENT OFFICE 2,647,009

APPARATUS FOR MOTOR TRANSPORTS

Paul J. Huebshman, Dearborn, Mich., assignor to Whitehead & Kales Company, River Rouge, Mich., a corporation of Michigan Application January 16, 1950, Serial No. 138,912

19 Claims. (Cl. 296—1)

The present invention relates to apparatus for motor transport, and more particularly, a transport for carrying five automobiles.

The economy with which automobiles may be carried by motor transport of course depends upon the number of automobiles which may be carried at one time. At the present time, conventional practice is to carry four automobiles. The advantage of carrying an additional automobile is obvious. However, the problem of providing a carrier for five automobiles is rendered difficult as a result of various State laws limiting overall length and height of the transport and also structural arrangements of car transports.

The present invention relates to a motor transport designed to carry five automobiles simultaneously and at the same time to comply with all known State laws governing the transportation of automobiles by motor transports.

It is an object of the present invention to provide a motor transport capable of carrying five automobiles simultaneously.

It is a further object of the present invention to provide a motor transport characterized by a novel relative placement of the automobiles on the transport.

It is a further object of the present invention to provide a motor transport comprising a truck and trailer combination in which a vertically spaced pair of automobile carrying tracks is provided on the truck, a second pair of vertically spaced automobile carrying tracks is provided on the trailer, and an intermediate pair of tracks is provided on either the truck or the trailer.

It is a further object of the present invention to provide a five-car transport constructed such that all of the automobiles carried by the transport are disposed substantially horizontally and in no case are any of the automobiles disposed at an angle substantially greater than ten degrees from the horizontal.

It is a feature of the present invention to provide a motor transport comprising forward and rear vertically spaced pairs of tracks in combination with an intermediate track shiftable to connect the lower rear track with the upper front track for loading, and to connect the lower rear track with the lower front track for loading, in which last position the intermediate track is located to carry an automobile in transit.

It is a further feature of the present invention to provide a motor transport having upper and lower forward tracks, upper and lower rear tracks, and an intermediate track, in which the intermediate track and the lower rear track are mounted for rocking movement about transverse axes located adjacent their rear ends in order to provide for alignment between the front end of the intermediate track and the rear end of the upper and lower front tracks, and between the front end of the lower rear track and the rear end of the intermediate track, the forward end of the lower rear track being downwardly movable from a position in alignment with the rear end of the intermediate track to position the lower rear track in automobile carrying position.

Other objects and features of the invention will become apparent as the description proceeds, especially when taken in conjunction with the accompanying drawings, wherein:

Figures 1 and 1A together comprise a side elevation of the motor transport.

Figure 2 is a fragmentary plan view of the truck taken substantially along the line 2—2, Figure 3.

Figure 3 is an end elevation partly in section of the truck, the section being indicated along the line 3—3, Figure 2.

Figure 4 is a fragmentary sectional view on the line 4—4, Figure 1.

Figure 5 is an enlarged elevational view of the parts included within the circle designated "Figure 5" in Figure 1.

Figure 6 is a horizontal section through the trailer taken substantially on the line 6—6, Figure 1A.

Figure 7 is an end elevation partly in section of the trailer structure.

Figure 8 is an enlarged view of details included within the circle designated "Figure 8" in Figure 1A.

Figure 9 is a section on the line 9—9, Figure 8.

Figure 10 is a section on the line 10—10, Figure 8.

Figure 11 is a fragmentary side elevation of the parts shown in Figure 8 with the track support element in track supporting position.

Figure 12 is a fragmentary section looking in the direction of the arrows 12—12, Figure 11.

Figure 13 is an enlarged detailed view of parts included within the circle designated "Figure 13" in Figure 1A.

Figure 14 is a fragmentary enlarged side elevation showing the relationship between a track and track support member.

Figure 15 is a section on the line 15—15, Figure 14.

Figure 16 is an enlarged detailed plan view illustrating the hinged connection of the upper rear track.

Figure 17 is a fragmentary section on the line 17—17, Figure 16.

Figure 18 is a partial section on the line 18—18, Figure 16.

Figure 19 is a plan view showing the mounting of the upper rear tracks.

Figure 20 is a perspective view illustrating a removable track member adapted to span the space between tracks on the truck and trailer.

Figure 21 is a plan view illustrating the connection between the truck and trailer.

Figure 22 is a side elevation of the connecting means illustrated in Figure 21, partly in section.

Figure 23:
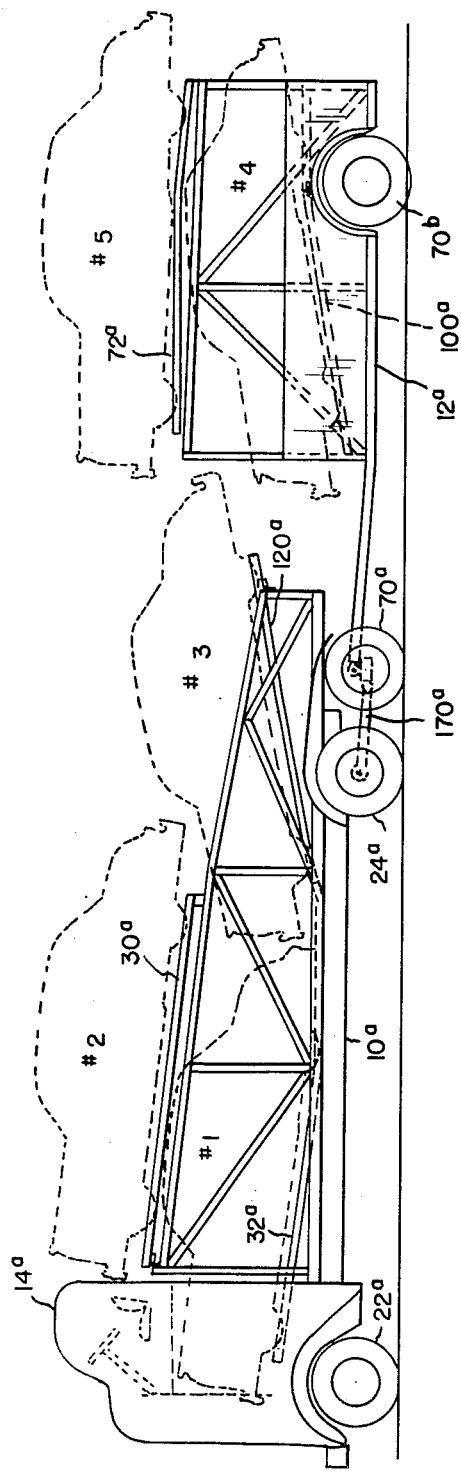
Figure 23 is a side elevation of a modified motor transport.

Referring now to the drawings, the transport chosen for purposes of illustration comprises a truck indicated generally at 10 and a trailer indicated generally at 12. The truck is of the type having an elevated cab 14 in which are located the driver's seat 16 and usual controls including the steering wheel 18. Beneath the cab 14 there is provided a substantial amount of cargo space herein indicated by the numeral 20. The truck includes the front steerable wheels 22 and rear wheels 24. The truck body includes the main frame sills 26 upon which are superimposed the load supporting truss-like body comprising posts 28 and top rails 30.

Located on the truck body is a lower front track 32 which as illustrated, extends beneath the cab 14 into the cargo space 20 so that a vehicle herein designated as car #1 may be positioned with its forward lower end disposed beneath the cab. At this time it may be mentioned that the automobiles may be located on the transport with either their front ends or their rear ends extending forwardly since the automobiles for which the transport is intended have relatively low front and rear portions.

The tracks 32 are provided with the usual stops 34 and conventional winch means indicated at 36 are provided for winching the automobiles down securely onto the track.

The truck is also provided with an upper forward track 38, which as best seen in Figure 5, is provided with a usual stop member 40 and which is pivoted as indicated at 42 to the frame including transverse elements 44 and vertical elements 46.

In Figure 1 the track 38 is shown in dotted lines in an elevated position which permits automobile #1 to be driven onto the track 32 without interference. Means are provided for retaining the track 38 in the upper position during loading of car #1 and this means comprises a spring 48 operatively connected to a bracing link 50 having a roller 52 movable along a curved trackway 54. This mechanism is designed to substantially counterbalance the weight of the track 38 so that the track may be moved to the upper position illustrated in dotted lines and will remain there until moved downwardly by the operator. Suitable toggle clamping mechanism indicated generally at 56 is provided for retaining the track 38 in its lowermost position. In the lowermost position illustrated in full lines in Figure 1 the track 38 is designed to carry an automobile herein designated as #2.

The trailer, best illustrated in Figures 1A, 6 and 7, comprises a framework including sills 60, vertically extending bars 62, top rails 64 and diagonal members 66, all suitably interconnected by conventional means such as welding or the like. At the forward end of the trailer 12 there is provided a pair of ground wheels 70 and means (later to be described) are provided for interconnecting the truck and trailer.

The trailer is provided at its rear end with a pair of upper rear track members 72 which as clearly seen in Figure 7, extend inwardly of the trailer body and hence in the automobile supporting position would interfere with passage of an automobile therebeneath. Accordingly, the tracks 72 are hinged as indicated at 74 to permit them to be swung upwardly and outwardly as seen in Figure 7, to provide clearance for an automobile to be moved beneath the tracks 72. The hinge structure is best illustrated in Figures 16, 17, 18 and 19. The hinge indicated generally at 74 is best seen in Figure 16 and comprises plates 76 welded or otherwise secured to the track 72, and corresponding plates 78 welded or otherwise secured to the frame. The hinge is completed by a hinge pin 80. Means are provided for counterbalancing the weight of the tracks 72 and this means comprises a coil torsion spring 82, one end of which as indicated at 84, is located within an opening in the frame plate 78 and the other end of which as indicated at 86, is located within a part 88 rigidly secured to one of the track supporting plates 76. Means are provided for retaining the tracks 72 in desired position and this means comprises cooperating openings 90 through which a cotter pin 92 extends. As best seen in Figure 1A, the upper rear track 72 is adapted to support an automobile designated as #5.

The trailer is also provided with a lower rear track 100 which is provided with a hinge 102 mounting the track 100 for vertical rocking movement about a transverse horizontal axis. The track 100 is adapted to carry a car designated as #4 in transit but is also movable to the dotted line position indicated to connect with the rear end of an intermediate track which will be subsequently described. In its lowermost or transit position the forward end of the track 100 is adapted to rest on a transverse bar 104 extending between the lower side plates 106. In order to retain the track 100 in its uppermost position, in which it connects with the rear end of the intermediate track, there is provided a pivoted supporting plate 110 which is shown in detail in Figure 14. As best seen in this figure, the track supporting plate 110 is provided with a pair of pivot plates 112 which are apertured to receive a pivot pin 114. The vertical frame member 62 is provided with a similar pair of rearwardly extending plates 116 likewise apertured to receive the pivot pin 114. A cotter pin 117 is provided which extends through one of the plates 112 and through one of two circumferentially spaced openings 118 provided in the plates 116. Thus, the track supporting plates 110 may be locked in inwardly extending position underlying and supporting the track members or they may be retained in positions displaced ninety degrees therefrom to provide clearance for passage of motor vehicles therepast.

An intermediate track designated 120 is mounted toward the center of the trailer. The track 120 is shiftable between the full line and the dotted line positions illustrated in Figure 1A. In the present case it is preferred to provide the track for shifting movement in the manner best illustrated in Figures 1A, 8, 9, 10, 11, 12 and 13. Referring now to these figures the track 120 is provided adjacent its forward end with a stop lug 122 (Figure 13) which is adapted to engage forwardly of a transversely extending I-beam 124. Adjacent its rear end as seen in Figure 8, the track 120 is provided with an oppositely facing lug 126 which engages rearwardly of a transverse I-beam 128. Thus in the load carrying position illustrated in full lines in Figure 1A, the track 120 is supported directly adjacent its ends on I-beams 124 and 128. Lateral shifting is prevented by brackets 129 on the I-beams. When the track 120 is shifted to the upper position indicated in dotted lines in Figure 1A, the track pivots about a pivot connection 130 at its rear end which is provided intermediate the track 120 and the forward end of the track 100. This pivot connection is best illustrated in Figure 10 wherein the rear end of track 120 is illustrated as provided with a downwardly directed recessed extension 132 into which extends a hinge connector 134 which is carried at the forward end of the track 100. The extension 132 and the hinge connector 134 are transversely apertured to receive the connecting hinge pin 136 which may be removed when it is desired to move the forward end of the lower rear track 100 downwardly. The hinge connection just described is inadequate to support the load of vehicles being moved over the tracks 100 and 120 and in order to provide adequate support for the track 120 additional means are provided. This means is best illustrated in Figures 8, 11 and 12 and comprises a hinged supporting device 140 which comprises a pair of plates 142 and a transverse track supporting plate 144. The plates 142 are disposed adjacent the hinge plates 146 which are welded or otherwise secured to the transverse I-beam 128 and the parts are apertured to receive a hinge pin 150. The support 140 is shaped so that when in load supporting position, shoulders indicated at 152 rest flat against the upper flange of the I-beam 128.

In the uppermost position indicated in dotted lines in Figure 1A, the forward end of the track 120 is supported by a pivoted track supporting plate 154 which is in all respects similar to the track supporting plate 110 previously described. In transit the track 120 occupies the full line position shown in Figure 1A and carries an automobile designated as #3 thereon.

Referring now to Figures 21 and 22, and Figure 6 there is illustrated the mechanism employed for interconnecting the truck 10 and the trailer 12. At its forward end the trailer is provided with load supporting wheels 70 which are interconnected by an axle 160, the usual leaf springs 162 being provided in their usual relationship. The main body of the trailer includes a forwardly extending tongue portion 164 which has a socket 166 connected to a ball 168 carried by the connector frame structure 170. The socket 166 if desired, may be removable from the ball 168 but it is emphasized that the trailer illustrated herein is a full trailer of which the front wheels are the wheels 70 previously described. The actual connection between the truck and trailer is accomplished by the connector structure 170 which as illustrated in Figures 21 and 22, comprises a pair of forwardly diverging arms 172 interconnected adjacent their forward ends by a cross member 174. The ends of the arms 172 are connected as indicated at 176 to depending brackets 178 which in turn are secured to the longitudinally extending frame members 26 of the truck.

If desired, it would be possible to provide the intermediate track so that it could connect directly to the rear end of the upper track 38 or the lower track 32 on the truck. However, in the illustrated embodiment the forward end of the track 120 is illustrated as displaced substantially rearwardly from the tracks 38 and 32. In order to interconnect these tracks for the passage of an automobile thereover the structure illustrated in Figure 20 is provided. This means comprises a track section 180 having a forwardly extending hinge connection 182 which is in all respects similar to the hinge connection 134 previously described. Tracks 32 and 38 are provided at their rear ends with a downwardly open recessed extension 184 which is in all respects similar to the corresponding extension 132 previously described as provided at the rear end of the track 120. A connector pin 186 is provided passing through aligned apertures in the parts 182 and 184. The track section 180 at its opposite end overlies the forward end of the track 120.

The relative relationship of the automobiles designated #1, #2, #3, #4, and #5 is illustrated in Figures 1 and 1A. The utility of and necessity for the structural details previously described will become apparent as the following description of operation and use proceeds. The preferred method of loading the truck is to load the vehicles under their own power by driving them either forwardly or in reverse into the position shown and in the sequence indicated by the numerals applied to the automobiles. In order to position the #1 automobile as illustrated in Figure 1, a suitable ramp or skid is provided at the rear of the trailer. The track 100 is located in the dotted line position with its forward end supported by the plate 110. This positions the forward end of the track 100 in alignment with the rear end of the track 120. The track 120 occupies the full line position illustrated in Figure 1A. The #1 automobile is thereafter driven over the track 100, the track 120, the track 180, and onto the track 32 with the low front or rear end of the vehicle disposed beneath the cab 14 of the truck. At this time and in order to provide clearance for the passage of the #1 automobile, tracks 72 are swung upwardly and outwardly as previously described, and the track 38 is moved upwardly to the dotted line position illustrated in Figure 1.

In order to move the #2 car into position the track 38 is moved to the full line position shown in Figure 1 and is locked in this position by the toggle lock mechanism 56. The intermediate track 120 is moved upwardly about the hinged axis provided by the hinge pin 136 to the dotted line position illustrated in Figure 1A. In this position its forward end is supported by the plate 154 and its rear end by the support 140. The track 100 remains in its elevated or loading position. Thereafter the #2 vehicle is driven either forwardly or in reverse over the tracks 100, 120, and 180, and onto the track 38.

Thereafter, the intermediate track 120 is lowered to the full line position shown in Figure 1A and the #3 automobile is driven over the track 100 and onto the intermediate track 120.

Thereafter, the track 100 is moved to the full line position shown in Figure 1A and automobile #4 is driven onto this track from the ramp or skid.

After the #4 automobile is in position the upper rear tracks 72 are lowered to horizontal position and a higher ramp or skid is provided and the #5 automobile is driven directly onto the track 72.

As will be understood, all of the automobiles are winched down into firm position and retained in place in accordance with conventional practice.

While the illustrated procedure in loading is preferred it will be appreciated that if desired the truck and trailer could be jackknifed and automobiles #1 and #2 could be driven directly onto the tracks 32 and 38, after which automobiles #3, #4, and #5 could be driven onto the trailer as previously described.

It will further be understood that while the intermediate track 120 is herein illustrated as mounted on and a part of the trailer 12, if desired the truck could be lengthened and the trailer correspondingly shortened and the intermediate track could be a portion of the truck rather than the trailer.

One of the important advantages realized by the present construction is the possibility of carrying five automobiles, none of which is disposed at a harmful or undesirable angle to the horizontal. In cases where automobiles are mounted at relatively large angles to horizontal it is necessary to drain the oil out of the vehicles and in some cases to perform other servicing operations either before or after loading or both. The most convenient method of loading the transport is to drive the automobiles into place onto the transport and if it were necessary to drain the oil from the automobiles, this would entail draining the oil after driving the automobiles onto the transport and replacing the oil before driving them off the transport. This in itself would be troublesome but a more serious objection is in the fact that the operators in many cases would fail to drain or replace the oil, and serious or permanent damage to the automobiles might result. By limiting inclination of automobiles to not more than 10 degrees, oil drainage is not required.

One of the important features of the present invention is in the provision of a movable intermediate track which serves three independent and distinct functions. In the first place, in its upper position the track 120 forms a part of a trackway extending to the upper forward track 38. In its lower position the track 120 forms part of a trackway leading to the lower forward track 32. Also in its lower position the intermediate track 120 serves as a support for an automobile in transit.

The location of the hinge connection at the rear of the intermediate track 120 is an important feature of the present invention. As a result of the location of the hinge connection of the trackway 120 in a slightly elevated position, and substantially above the forward end of the lower rear track 100 when the track 100 is in transit position, it is possible to position the relatively low rear end portion of the #3 automobile intermediate the forward ends of automobiles #4 and #5.

Another important feature of the present invention is the use of an elevated cab structure on the truck which permits positioning the lower forward automobile with its forward end beneath the cab 14. Since the trackway 38 is located rearwardly of the cab, it follows that the #2 automobile is also disposed rearwardly of the cab and hence extends rearwardly of the #1 automobile. Accordingly, the intermediate track 120 in transit position, extends downwardly and forwardly so as to position the relatively low forward end of the #3 vehicle below the rearwardly extending portion of the #2 automobile.

In Figure 23 there is illustrated a variation of the structure previously described in detail. In this figure the tractor or truck is indicated generally at 10a and the trailer is indicated generally at 12a. The truck includes the elevated cab 14a and front wheels 22a and rear wheels 24a. The trailer includes front wheels 70a and rear wheels 70b. On the frame of the truck is the lower front track 32a and the upper front track 30a located to the rear of the cab 14a. In this instance the intermediate track 120a is mounted on the frame of the truck 10a. Mounted on the trailer 12a is the lower rear track 100a and the upper rear track 72a. The #1 automobile is mounted on the track 32a, the #2 automobile is mounted on the track 30a, the #3 automobile is mounted on the track 120a, the #4 automobile is mounted on the track 100a, and the #5 automobile is mounted on the track 72a. Each of the tracks 30a, 32a, 72a, 100a, and 120a are of a length sufficient to support both the front and rear wheels of a single vehicle in transit and the intermediate track 120a is pivoted so as to constitute a forward extension of the track 100a to connect it to the upper front track 30a so as to permit the #2 automobile to be driven into transit position. Coupling means indicated generally at 170a are provided for selectively connecting and disconnecting the truck and trailer.

The description of the present invention has been limited in general to the improved features constituting the basis of the present invention and no effort has been made to go into detail on features which are more or less conventional in present practice. Thus for example, the details of the winching mechanism have not been described, nor have the details of the exact track structure. It may be mentioned that in describing the tracks, and in order to simplify the disclosure and claims, reference is made to a forward lower track for example without calling particular attention to the fact that this forward lower track in fact comprises two separate and independent track elements. This practice has been followed throughout with considerable simplification of the description.

The drawings and the foregoing specification constitute a description of the improved apparatus for motor transport in such full, clear, concise and exact terms as to enable any person skilled in the art to practice the invention, the scope of which is indicated by the appended claims.

What I claim as my invention is:

1. A five-car motor transport comprising an elevated driver's cab providing cargo space thereunderneath, a forward lower track extending beneath said cab, a forward upper track mounted for upward movement into clearance position and disposed generally over said forward lower track, a lower rear track hinged at its rear end for vertical swinging movement of its forward end, an intermediate track having its rear end elevated above the hinge connection for the lower rear track, the forward end of said intermediate track being movable into position adjacent the rear ends of said forward tracks, and an upper rear track disposed above said lower rear track, each of said tracks being of a length sufficient to support both front and rear wheels of a single automobile.

2. A transport as defined in claim 1 in which said forward upper track is hinged at its forward end for vertical swinging movement.

3. A transport as defined in claim 1 in which said upper rear track comprises separate track members at opposite sides of the transport, said track members being hinged at their outer edges for swinging movement about generally longitudinally extending axes for movement into clearance position.

4. A transport as defined in claim 1 in which said upper forward track is disposed directly in rear of said cab, and extends rearwardly beyond said forward lower track.

5. A five-car motor transport comprising a forward lower track, a forward upper track mounted for upward movement into clearance position and disposed generally over said forward lower track, a lower rear track hinged at its rear end for vertical swinging movement of its forward end, an intermediate track having its rear end elevated above the hinge connection for the lower rear track, the forward end of said intermediate track being movable into position adjacent the rear ends of said forward tracks, and an upper rear track disposed above said lower rear track, each of said tracks being of a length sufficient to support both front and rear wheels of a single automobile.

6. A five-car motor transport comprising a truck-trailer combination, a forward lower track on said truck, a forward upper track on said truck, a rear lower track on said trailer, a rear upper track on said trailer, an intermediate track on said trailer, said rear lower track being shiftable between a loading position in which it aligns with the rear end of said intermediate track and a carrying position in which its forward end is lowered to position the low forward end of an automobile carried thereby to be positioned beneath the rear end of an automobile carried by said intermediate track.

7. A transport as defined in claim 6 in which said intermediate track is generally horizontal in carrying position.

8. A transport as defined in claim 6 in which said intermediate track is disposed at an angle of not substantially more than ten degrees in carrying position.

9. A five-car motor transport comprising a truck-trailer combination, a forward lower track on said truck, a forward upper track on said truck, a rear lower track on said trailer, a rear upper track on said trailer, an intermediate track on said trailer, said intermediate track being pivoted about a transverse axis at its rear end, means for supporting the forward end of said intermediate track in alignment with the rear end of said forward upper track for loading said forward upper track, and means for supporting the forward end of said intermediate track in alignment with the rear end of said forward lower track for loading said forward lower track, said intermediate track being slightly forwardly and downwardly inclined in said last position to carry an automobile with its rear slightly elevated in transit.

10. A transport as defined in claim 9 in which said lower rear track is pivoted about a transverse axis at its rear end for movement between a loading position in which it aligns with the rear end of said intermediate track and a carrying position in which its forward end is lowered to position the low forward end of an automobile carried thereby to be positioned beneath the rear end of an automobile carried by said intermediate track.

11. In a five-car motor transport, a pair of vertically spaced forward tracks, a pair of vertically spaced rear tracks, and an intermediate track movable to connect said lower rear track with either of said forward tracks, the forward end of said lower rear track being movable to connect with said intermediate track or to be disposed substantially lower than the rear end of said intermediate track to position the low front end of an automobile beneath the rear end of an automobile on said intermediate track.

12. In a five-car motor transport, a pair of vertically spaced forward tracks, a pair of vertically spaced rear tracks, and an intermediate track movable to connect said lower rear track with either of said forward tracks, said intermediate and lower rear tracks being hinged at their rear ends for vetrical swinging movement of their forward ends between loading and transit positions, the hinge connection of said intermediate track being elevated with respect to the hinge connection of said lower rear track.

13. A transport as defined in claim 12 in which said lower rear track and said intermediate track are both inclined downwardly and forwardly in transit position.

14. A five-car motor transport comprising a truck vehicle, a trailer vehicle, a forward lower track on said truck vehicle, a forward upper track on said truck vehicle, a lower rear track on said trailer vehicle, an upper rear track on said trailer vehicle, and an intermediate track on one of said vehicles, said intermediate track being movable from a loading position in which it connects said lower rear track with said forward upper track, and a combined loading-transit position in which it connects said lower rear track with said forward lower track, the forward end of said intermediate track being lower than its rear end in transit position to position an automobile carried thereby with its rear end disposed between the forward ends of automobiles carried by said rear tracks.

15. A transport as defined in claim 14 in which said intermediate track carries an automobile in transit at an angle not substantially greater than ten degrees.

16. A five-car transport comprising upper and lower front tracks, an intermediate track, upper and lower rear tracks, said intermediate track and said lower rear track being pivoted at their rear ends for vertical swinging to loading position to provide a continuous trackway to said upper front track, said tracks in transit position being positioned to support a pair of automobiles at the front of the transport in overlying relation, a pair of automobiles at the rear of the transport in overlying relation, and an automobile in intermediate position in which the forward end of the intermediate automobile underlies the rear end of the upper front automobile and the rear end of the intermediate automobile is interposed between the forward ends of the rear pair of automobiles.

17. A transport as defined in claim 16 in which said tracks are arranged such that all automobiles carried thereby are disposed not substantially more than 10 degrees from horizontal so as to not require draining of the oil from the engines thereof in transit.

18. A five-car motor transport comprising a forward lower track, a forward upper track, an intermediate track, a lower rear track, and an upper rear track, said intermediate and lower rear tracks being mounted for movement into loading positions to provide a continuous trackway to either of said forward tracks, each of said tracks being of a length sufficient to support both the front and rear wheels of a single automobile in transit, said lower rear track and said intermediate track being both inclined downwardly and forwardly in transit position and mounted for movement into loading position in which their forward ends are higher than their rear ends.

19. A five-car motor transport comprising a truck vehicle, a trailer vehicle, a forward lower track on said truck vehicle, a forward upper track on said truck vehicle, a lower rear track on said trailer vehicle, an upper rear track on said trailer vehicle, and an intermediate track on one of said vehicles, said intermediate track being movable from a forwardly and upwardly inclined position in which it connects said lower rear track with said forward upper track, and a forwardly and downwardly inclined combined loading-transit position in which it connects said lower rear track with said forward lower track, each of said tracks being of a length sufficient to support both the front and rear wheels of a single automobile, said tracks being so disposed that each may support an automobile simultaneously without interference with the automobiles on the remaining tracks.

PAUL J. HUEBSHMAN.

References Cited in the file of this patent

UNITED STATES PATENTS

| Number | Name | Date |
|---|---|---|
| 2,103,669 | Francis | Dec. 28, 1937 |
| 2,146,567 | Dondlinger | Feb. 7, 1939 |